(12) United States Patent
Rohde et al.

(10) Patent No.: US 10,012,994 B2
(45) Date of Patent: Jul. 3, 2018

(54) METHOD AND APPARATUS FOR OPERATING AT LEAST ONE PARTLY OR HIGHLY AUTOMATED VEHICLE

(71) Applicant: Robert Bosch GmbH, Stuttgart (DE)

(72) Inventors: Jan Rohde, Stuttgart (DE); Holger Mielenz, Ostfildern (DE)

(73) Assignee: ROBERT BOSCH GMBH, Stuttgart (DE)

( * ) Notice: Subject to any disclaimer, the term of this patent is extended or adjusted under 35 U.S.C. 154(b) by 14 days.

(21) Appl. No.: 15/291,254

(22) Filed: Oct. 12, 2016

(65) Prior Publication Data

US 2017/0108869 A1 Apr. 20, 2017

(30) Foreign Application Priority Data

Oct. 20, 2015 (DE) .......... 10 2015 220 449

(51) Int. Cl.
| | | |
|---|---|---|
| G05D 1/02 | (2006.01) | |
| B60W 30/095 | (2012.01) | |
| B60W 30/18 | (2012.01) | |
| G01C 21/36 | (2006.01) | |
| G05D 1/00 | (2006.01) | |

(Continued)

(52) U.S. Cl.
CPC ....... *G05D 1/0219* (2013.01); *B60W 30/0956* (2013.01); *B60W 30/18009* (2013.01); *G01C 21/3694* (2013.01); *G05D 1/0088* (2013.01); *G06K 9/00791* (2013.01); *G08G 1/096827* (2013.01); *B60W 2420/52* (2013.01); *B60W 2550/00* (2013.01); *B60W 2720/24* (2013.01); *G05D 1/0289* (2013.01); *G05D 2201/0213* (2013.01); *G08G 1/167* (2013.01)

(58) Field of Classification Search
CPC .............. G05D 1/0219; G05D 1/0088; G05D 2201/0213; G08G 1/096827; G08G 1/167; B60W 30/0956; B60W 30/18009; B60W 2420/52; B60W 2550/00; B60W 2720/24; G01C 21/3694
USPC ........................................................ 701/25
See application file for complete search history.

(56) References Cited

U.S. PATENT DOCUMENTS

| | | |
|---|---|---|
| 5,570,285 A | 10/1996 | Asaka et al. |
| 2005/0060069 A1* | 3/2005 | Breed .................. B60N 2/2863 |
| | | 701/408 |

(Continued)

FOREIGN PATENT DOCUMENTS

| | | |
|---|---|---|
| DE | 102014200494 | 7/2015 |
| WO | 2013069195 A1 | 5/2013 |

*Primary Examiner* — Anne M Antonucci
*Assistant Examiner* — James E Stroud
(74) *Attorney, Agent, or Firm* — Norton Rose Fulbright US LLP; Gerard Messina

(57) ABSTRACT

A method and an apparatus for operating at least one partly or highly automated vehicle, environmental values that represent the environment of the at least one partly or highly automated vehicle being detected by way of at least one environmental detection system of the at least one partly or highly automatic vehicle; operation of the partly or highly automated vehicle occurring depending on the detected environmental values, and at least two possible trajectories for operation of the at least one partly or highly automated vehicle being determined, of the at least two possible trajectories, one trajectory that is to be used being selected depending on the detected environmental values.

8 Claims, 3 Drawing Sheets

(51) Int. Cl.
    *G08G 1/0968*     (2006.01)
    *G06K 9/00*     (2006.01)
    *G08G 1/16*     (2006.01)

(56) References Cited

U.S. PATENT DOCUMENTS

| | | | |
|---|---|---|---|
| 2012/0083947 A1* | 4/2012 | Anderson | B60W 30/09 |
| | | | 701/3 |
| 2012/0139755 A1 | 6/2012 | Ginsberg | |
| 2013/0151062 A1 | 6/2013 | Lee et al. | |
| 2014/0163862 A1 | 6/2014 | Choi et al. | |
| 2016/0325753 A1* | 11/2016 | Stein | B60W 40/06 |
| 2017/0015312 A1 | 1/2017 | Latotzki | |
| 2017/0017237 A1 | 1/2017 | Tokuyama et al. | |

* cited by examiner

METHOD AND APPARATUS FOR OPERATING AT LEAST ONE PARTLY OR HIGHLY AUTOMATED VEHICLE

CROSS REFERENCE

The present application claims the benefit under 35 U.S.C. § 119 of German Patent Application No. DE 102015220449.9 filed on Oct. 20, 2015, which is expressly incorporated herein by reference in its entirety.

FIELD

The present invention relates to a method and an apparatus for operating at least one partly or highly automated vehicle, one of several possible trajectories being selected depending on environmental values.

BACKGROUND INFORMATION

German Patent Application No. DE 10 2014 200 494 A1 describes a method for operating a vehicle, first trajectory parameters for calculating a target trajectory of the vehicle being ascertained depending on an estimated friction value; the estimated friction value being an indication of a friction between a wheel of the vehicle and a roadway on which the wheel is rolling; depending on the at least one parameter, either the target trajectory of the vehicle being calculated depending on the first trajectory parameters, or second trajectory parameters being ascertained depending on a new friction value that is less than the estimated friction value.

SUMMARY

An example method and apparatus according to the present invention for operating at least one partly or highly automated vehicle proceeds from the fact that environmental values that represent the environment of the at least one partly or highly automated vehicle are detected by way of at least one environmental detection system of the at least one partly or highly automatic vehicle. Operation of the partly or highly automated vehicle occurs depending on the detected environmental values, and at least two possible trajectories for operation of the at least one partly or highly automated vehicle are determined.

In accordance with the present invention, from at least two possible trajectories, one trajectory that is to be used is selected depending on the detected environmental values.

The partly or highly automated vehicle as embodied here for the method according to the present invention can be both an unmanned and a manned vehicle. A road vehicle is possible, as are floating, submersible, or flight-capable vehicles, as well as vehicles that encompass several of these different vehicle types. The "environmental values" here can be, inter alia, map data.

The present invention has the advantage that an additional selection aid is furnished in the context of a selection possibility among several trajectories for a partly or highly automated vehicle. This permits intelligent operation of the vehicle, since because of the dependence of the selected trajectory on environmental values, the trajectory actually to be traveled is not selected arbitrarily but instead further parameters—which are very significant in the case of partly automated vehicles and in particular with highly automated vehicles—are taken into consideration. A detailed and current knowledge of environmental values, and the orientation of the trajectory, are indispensible for safe operation of such a vehicle.

In a particularly preferred embodiment a localization of the partly or highly automated vehicle within a predefined localization system is performed depending on the environmental values. The one trajectory that is to be used is selected in this context in such a way that localization according to predefined criteria is performed faster and/or more accurately than in the context of selection of another trajectory of the at least two possible trajectories.

For safe operation of a partly or highly automated vehicle, localization of the vehicle is performed both accurately and very fast. A maximally exact knowledge of the actual position of the vehicle is of the greatest possible significance specifically in the context of highly automated driving that occurs with no intervention by a driver, since safe operation of the vehicle would not be possible without that knowledge. One advantage of the example method according to the present invention is that a trajectory is selected so that the possibility of exactly localizing the vehicle is constantly optimized.

Detection of the environmental values preferably occurs by way of at least one sensor of the at least one partly or highly automated vehicle.

Detection of the environmental values by way of at least one sensor of the vehicle permits a knowledge of actually existing environmental values that simplify the selection of a trajectory that is to be used.

Detection of the environmental values preferably occurs by way of a map that contains environmental features.

Selection of the trajectory that is to be used can be effected as quickly as possible thanks to a knowledge of already existing environmental features that are taken from a map; this is relevant both for safety and for reliable and rapid localization of the vehicle.

Further environmental features are preferably retrieved from an external data source and integrated into the map.

This makes it possible to ensure that all available environmental features are always contained in the map; this is indispensible for accurate and thus safe operation of a partly or highly automated vehicle, since a maximally exact knowledge of the vehicle's environment, as well as localization of the vehicle within that environment, is one of the basic prerequisites for any operation of a partly or highly automated vehicle.

According to the present invention, an apparatus for operating at least one partly or highly automated vehicle is made available, environmental values that represent the environment of the at least one partly or highly automated vehicle being detected by way of at least one environmental detection system of the at least one partly or highly automated vehicle. First means are provided with which operation of the partly or highly automated vehicle occurs depending on the detected environmental values, and second means are provided with which at least two possible trajectories for operation of the at least one partly or highly automated vehicle are determined. Third means are also provided with which, of the at least two possible trajectories, one trajectory that is to be used is selected depending on the detected environmental values.

Fourth means, with which a localization of the partly or highly automated vehicle within a predefined localization system is performed depending on the environmental values, are preferably provided for the apparatus. Also provided are fifth means with which the one trajectory that is to be used is selected in such a way that localization according to predefined criteria is performed faster and/or more accurately than in the context of selection of another of the at least two possible trajectories.

In a particularly preferred embodiment the environmental detection system is at least one sensor of the at least one partly or highly automated vehicle. The environmental detection system can also be a system that encompasses a map storage unit on which a map is stored, and/or an environmental feature readout unit with which environmental features can be read out from the stored map, and/or a transmitting and receiving unit with which environmental features can be retrieved from an external data source and integrated into the stored map.

Advantageous refinements of the present invention are described herein and are shown in the figures.

BRIEF DESCRIPTION OF THE DRAWINGS

Exemplifying embodiments of the present invention are depicted in the figures and are explained in further detail below.

DETAILED DESCRIPTION OF EXAMPLE EMBODIMENTS

Figure 1:
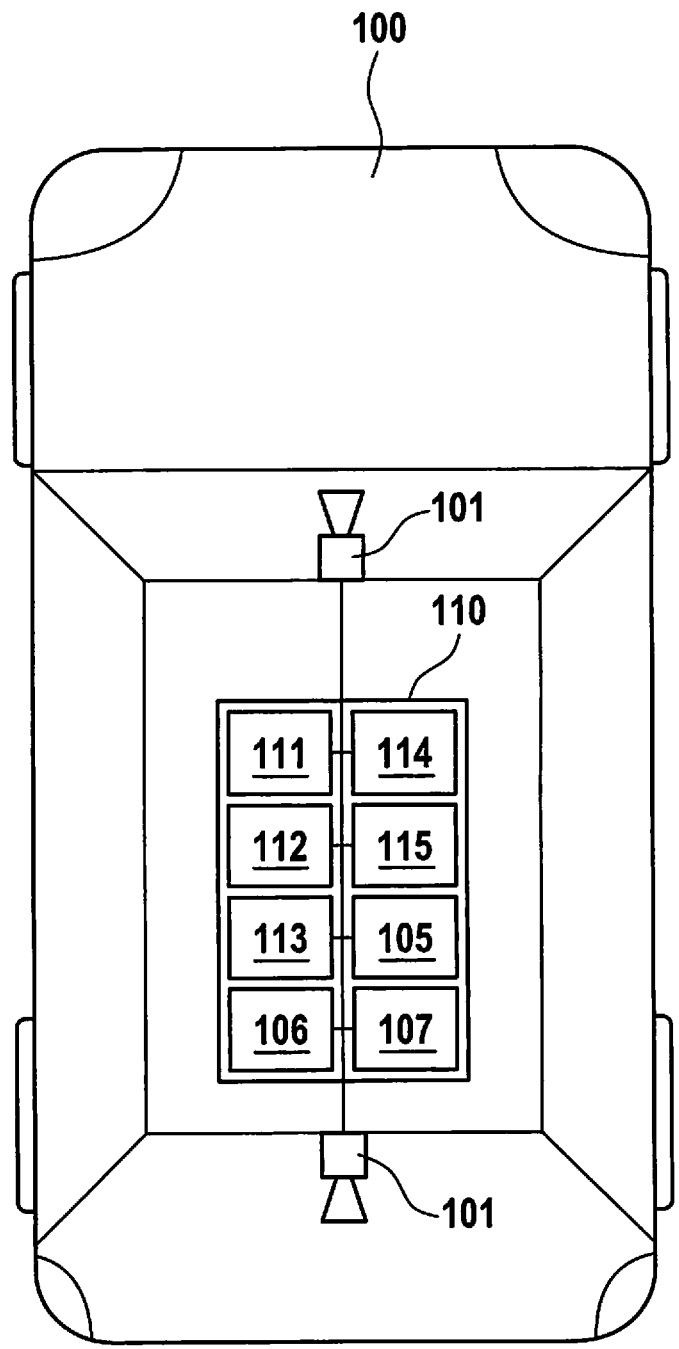
FIG. 1 shows, merely by way of example, a partly or highly automated vehicle that encompasses the apparatus according to the present invention with which the method according to the present invention for operating the at least one partly or highly automated vehicle is carried out.

FIG. 1 shows, purely by way of example, a partly or highly automated vehicle 100 that encompasses an apparatus 110 according to the present invention. This apparatus encompasses an environmental detection system 101 as well as first means 111 with which the operation of partly or highly automated vehicle 100 occurs depending on the environmental values detected by environmental detection system 101.

Environmental detection system 101 can be made up of one or more sensors, for example video and/or radar and/or lidar and/or ultrasound and/or infrared sensors. Environmental detection system 101 can also be, for example, a navigation system or other systems that encompass a map that contains environmental features. A corresponding storage medium 105, on which the map is stored, is provided.

This type of environmental detection system 101 furthermore encompasses an environmental feature readout unit 106 with which the environmental features that are necessary for the method according to the present invention can be read out from the map.

A further embodiment of environmental detection system 101 provides a transmitting and receiving unit 107. This makes it possible, in addition to or independently of the embodiments already described, to retrieve from an external data source environmental features for the corresponding environment 210 of partly or highly automated vehicle 100. The map can, for example, be expanded to include missing environmental features.

First means 111 are designed to execute any possible operation of vehicle 100 depending on its environment 210. This encompasses both operation in terms of safety-relevant aspects and operation in terms of aspects relevant to forward motion.

Vehicle 100 furthermore encompasses second means 112 that can determine possible trajectories 201, 202 for vehicle 100. This involves, for example, a corresponding control unit that encompasses all necessary units for enabling such trajectories 201, 202 to be determined, for example a computation unit, working memory, a hard drive, and a corresponding program for calculating trajectories 201, 202.

The vehicle furthermore encompasses third means 113 with which a trajectory 201 that is to be used can be selected depending on the environmental values. This can be accomplished, for example, by the fact that for each trajectory 201, 202, corresponding environmental values are detected by way of environmental detection system 101 in one of the ways described, and are weighted in accordance with predefined criteria known to third means 113. The weighting indicates which of the trajectories 201, 202 is selected. For example, the number of possible environmental features located within detection range of one or more sensors of vehicle 100 can serve as a weighting criterion.

A further weighting possibility is to carry out a qualitative comparison of individual environmental values along the various trajectories 201, 202 and to select, based on the qualitative distinguishing features of the environmental values, trajectory 201 that is to be used.

A localization of the vehicle within a localization system 210 depending on environmental values can be carried out by way of fourth means 114 that are provided. Environment 200 of vehicle 100, for example landscape features, buildings, or also parts of the traffic infrastructure, serves for orientation by the fact that individual environmental features are compared with already known environmental features that are noted on a map. A "localization system" 210 can be understood both as a two-dimensional map such as the one used for navigation systems, in which the position of a vehicle is indicated in length and width coordinates, and as, for example, a three-dimensional map in which an elevation parameter is also used in addition to the coordinates already recited. This can be useful, for partly automated and specifically for highly automated vehicles 100, in particular when traveling through a mountainous area.

Because it is important, for localization of vehicle 100 using environmental values that (as already described by way of example) describe environment 210 of the vehicle in the form of environmental features, to detect environment 210 as quickly and exactly as possible, of the determined trajectories 201, 202, one trajectory 201 that is to be used can be selected using fifth means 115 in such a way that the environmental features of environment 210 which are necessary and/or advantageous for localization of vehicle 100 are detected better than if another of the determined trajectories 202 is used. The trajectory that is to be used can be selected, depending on environment 210 of vehicle 100, on the basis of various criteria. The number of environmental features present can be significant, for example, since a larger number of environmental features can enable easier and/or faster and/or more exact localization of vehicle 100.

However, the accuracy with which an environmental feature can be detected can also be relevant, for example, in terms of the selection of trajectory 201 that is to be used. At night, for example, one illuminated building can more easily be detected as an environmental feature than several landscape features, for example lakes, forests, and/or mountains.

Figure 2:
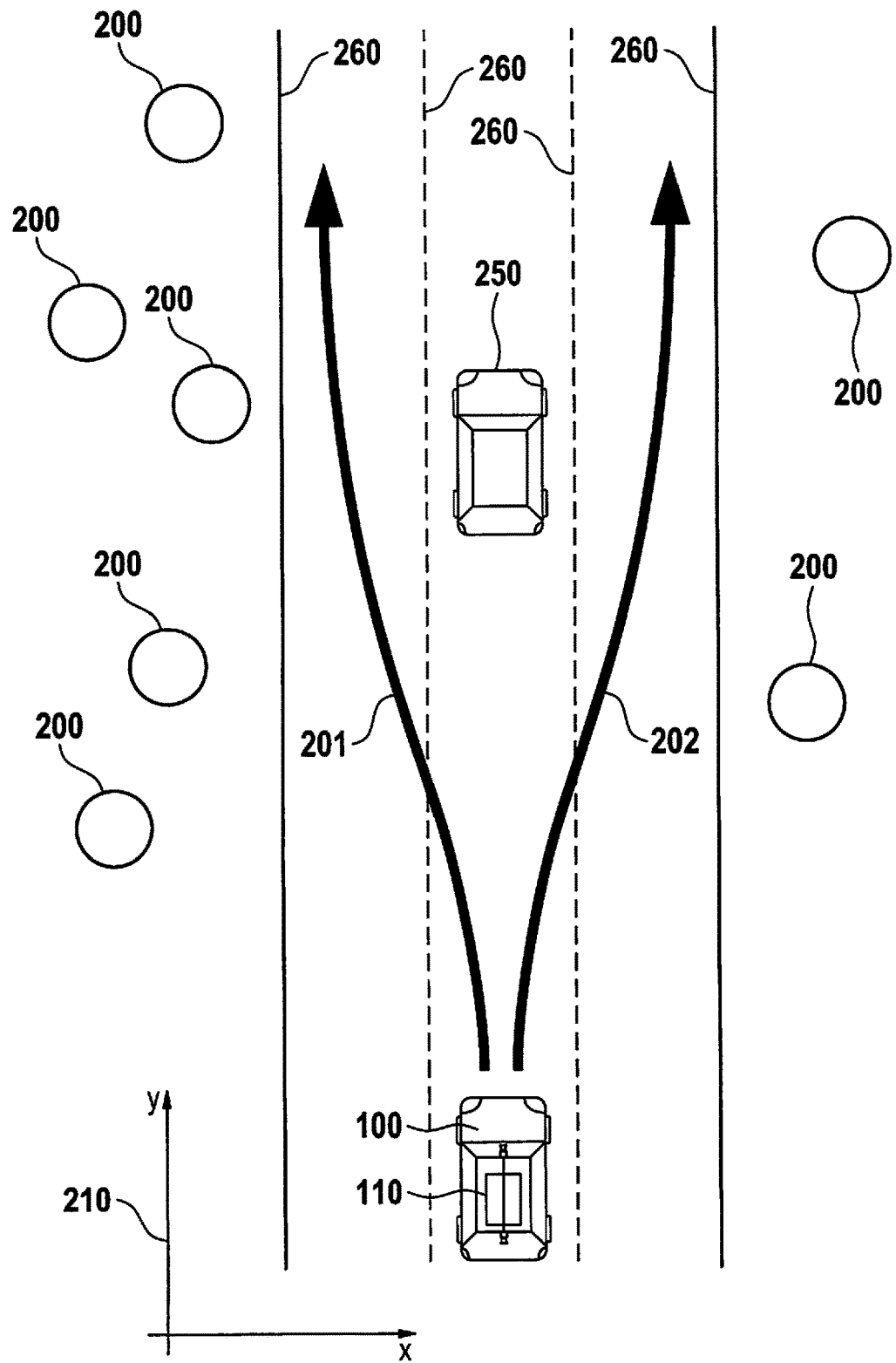
FIG. 2 shows an exemplifying embodiment of the method according to the present invention for operating at least one partly or highly automated vehicle.

FIG. 2 shows an exemplifying embodiment of the method according to the present invention. Here partly or highly automated vehicle 100, which encompasses the apparatus according to the present invention, is approaching another vehicle 250 located in front of it. The environment shown here is, by way of example, a stretch of road that is indicated by way of dashed and solid lines 260. For the exemplifying embodiment shown here, it is stated explicitly that selection of the trajectories is determined independently of national road traffic regulations or other traffic-related laws.

In the example shown here, there exists for partly or highly automated vehicle 100 the possibility of using two trajectories 201, 202 to drive past vehicle 250 located in front of it. Environment 200 is indicated here by way of example by the circles respectively to the left and right of the roadway, the individual circles each representing an environmental feature that is used for localization of the partly or highly automated vehicle within a predefined localization system 210.

In this exemplifying embodiment, selection of the trajectory that is to be used occurs on the principle of the number of environmental features. Left trajectory 201 is therefore selected here, since more environmental features that can be detected by the vehicle are located along this trajectory than along the other, right trajectory 202 available here.

Figure 3:
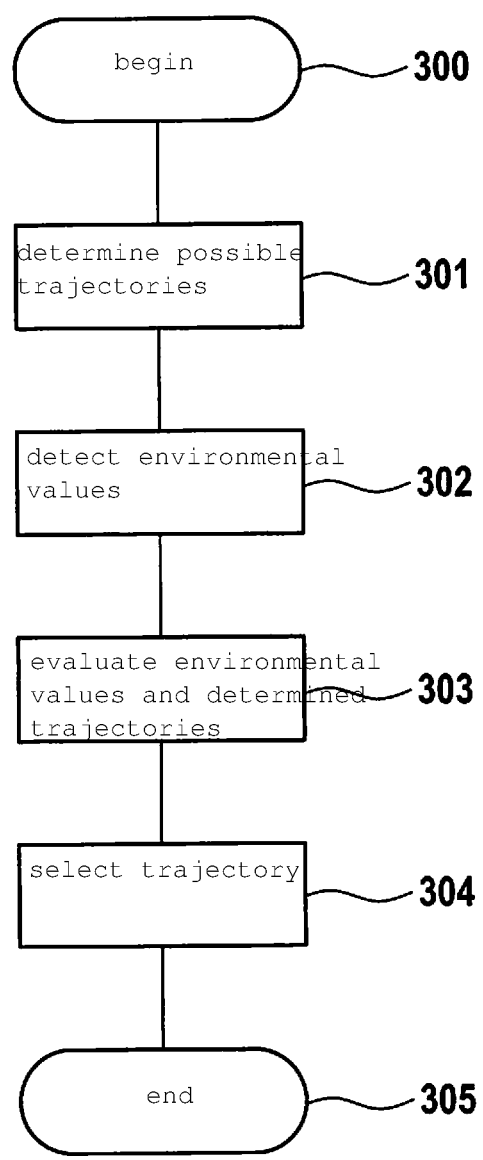
FIG. 3 is an exemplifying flow chart of the method according to the present invention for operating at least one partly or highly automated vehicle.

FIG. 3 schematically depicts an exemplifying embodiment based on a flow chart referring to FIG. 2.

The method begins in step 300, as the trajectory of partly or highly automated vehicle 100 changes because it wishes to drive past a vehicle 250 located in front of it.

In step 301 the possible trajectories 201, 202 for vehicle 100 are determined.

In step 302 environmental values along the determined trajectories 201, 202 are detected. This is accomplished by way of at least one sensor 101 of vehicle 100 and/or by way of a map which contains environmental values that represent environmental features. It is also possible to take into consideration, by way of the map, further environmental features that are still out of range of sensors 101 but are coming into sensor range along the trajectory that is to be used.

In step 303 the detected environmental values along the determined trajectories 201, 202 are evaluated so as to ascertain the one of the two trajectories 201, 202, shown by way of example in FIG. 2, along which a localization can be carried out more easily and/or faster and/or more exactly.

In step 304 trajectory 201 that is to be used is selected in accordance with the evaluation in the preceding step.

The method ends at step 305.

Further exemplifying embodiments and mixed forms of the examples depicted are of course also possible.

What is claimed is:

1. A method for operating at least one partly or highly automated vehicle, the method comprising:
    detecting environmental values, via at least one environmental detection system of the at least one partly or highly automatic vehicle, the environmental values representing an environment of the at least one partly or highly automated vehicle;
    operating the partly or highly automated vehicle depending on the detected environmental values;
    determining at least two possible trajectories for operating the at least one partly or highly automated vehicle;
    selecting one trajectory of the at least two possible trajectories depending on the number of detected environmental values; and
    performing a localization of the partly or highly automated vehicle within a predefined localization system depending on the environmental values.

2. The method as recited in claim 1,
    wherein the one trajectory that is to be used is selected so that localization according to predefined criteria is performed at least one of faster and more accurately, than in the context of selection of another trajectory of the at least two possible trajectories.

3. The method as recited in claim 1, wherein the environmental values are detected by way of at least one sensor of the at least one partly or highly automated vehicle.

4. The method as recited in claim 1, wherein the environmental values are detected by way of a map that contains environmental features.

5. The method as recited in claim 4, wherein further environmental features are retrieved from an external data source and integrated into the map.

6. An apparatus for operating at least one partly or highly automated vehicle, the apparatus comprising:
    at least one environmental detection system, of the at least one partly or highly automated vehicle, configured to detect environmental values which represent an environment of the at least one partly or highly automated vehicle;
    a first arrangement with which operation of the partly or highly automated vehicle occurs depending on the detected environmental values;
    a second arrangement with which at least two possible trajectories for operation of the at least one partly or highly automated vehicle are determined; and
    a third arrangement with which, of the at least two possible trajectories, one trajectory that is to be used is selected depending on the number of detected environmental values; and
    a fourth arrangement with which a localization of the partly or highly automated vehicle within a predefined localization system is performed depending on the environmental values.

7. The apparatus as recited in claim 6, further comprising:
    a fifth arrangement with which the one trajectory that is to be used is selected so that localization according to predefined criteria is performed at least one of faster and more accurately, than in the context of selection of another of the at least two possible trajectories.

8. The apparatus as recited in claim 6, wherein the environmental detection system includes at least one of:
    at least one sensor of the at least one partly or highly automated vehicle;
    a system that includes at least one of a map storage unit on which a map is stored, an environmental feature readout unit using which environmental features may be read out from the stored map, and a transmitting and receiving unit using which environmental features may be retrieved from an external data source and integrated into the stored map.

* * * * *